United States Patent [19]

Irani et al.

[11] 4,209,497

[45] Jun. 24, 1980

[54] PREPARATION OF DETERGENT GRADE SODIUM TRIPOLYPHOSPHATE FROM WET PROCESS PHOSPHORIC ACID AND SODA ASH

[75] Inventors: Mazin R. Irani, Tarrytown; Kirk V. Darragh, Yorktown, both of N.Y.

[73] Assignee: Stauffer Chemical Company, Westport, Conn.

[21] Appl. No.: 644,708

[22] Filed: Dec. 29, 1975

[51] Int. Cl.$^2$ .................. C01B 15/16; C01B 25/26; C01B 25/16
[52] U.S. Cl. .............................. 423/315; 423/321 R
[58] Field of Search ............ 423/315, 321, 308, 309, 423/312, 313, 314

[56] References Cited

U.S. PATENT DOCUMENTS

| | | | |
|---|---|---|---|
| 2,747,964 | 5/1956 | Bacon et al. | 423/315 |
| 3,423,170 | 1/1969 | Edwards et al. | 423/313 |

FOREIGN PATENT DOCUMENTS 1035114  9/1954  Fed. Rep. of Germany ........... 423/321

OTHER PUBLICATIONS

The Condensed Chemical Dictionary, 6th Ed. pp. 839, 840, 589.

*Primary Examiner*—O. R. Vertiz
*Assistant Examiner*—Gregory A. Heller
*Attorney, Agent, or Firm*—Roger S. Benjamin

[57] ABSTRACT

A process for preparing detergent grade sodium tripolyphosphate from wet process phosphoric acid comprising neutralizing said acid to a pH at which the Na:P ratio is about 5:3, contacting the resultant mixture of mono- and disodium orthophosphates with an oxidizing agent selected from the group consisting of ozone, hydrogen peroxide and mixtures thereof, in amounts sufficient to oxidize color causing impurities, and drying and heating said orthophosphates to effect the change to sodium tripolyphosphate.

6 Claims, No Drawings

PREPARATION OF DETERGENT GRADE SODIUM TRIPOLYPHOSPHATE FROM WET PROCESS PHOSPHORIC ACID AND SODA ASH

BACKGROUND OF THE INVENTION

The present invention relates to a method for preparing sodium tripolyphosphate from a wet process phosphoric acid, and more particularly, the preparation of white sodium tripolyphosphate from the neutralization of wet process phosphoric acid with soda ash or sodium hydroxide.

Sodium tripolyphosphate (STPP), also known as pentasodium tripolyphosphate ($Na_5P_3O_{10}$), is one of the major detergent builders in use today. The use of STPP as a detergent builder is to increase the cleaning ability of detergent compositions. It is made in larger quantities than any other high purity phosphate. The total U.S. production in 1974 exceeded 800,000 tons.

Compared to its use as a builder for detergents, other uses of $Na_5P_3O_{10}$ become minor. However, large tonnages are consumed annually as deflocculants for solid slurries to reduce the amount of water needed as in the cases of cement manufacturing, oil well drilling mud formulations, and kaolin clay processing.

Anhydrous sodium tripolyphosphate occurs in two crystalline forms. Form II, the low temperature variety, is obtained at about 400° C. It is usually converted to Form I, the thermodynamically stable phase and high temperature variety, by heating at a temperature of about 500° to about 550° C. The phase transition temperature of Form II to Form I is 417° C. Reverse transition of Form I to Form II is difficult. See A. D. F. Toy's treatise on "Inorganic Phosphorus Chemistry" in *Comprehensive Inorganic Chemistry*, Vol. 2 Chapter, 20, page 515 (Pergamon Press 1973), edited by Bailar et al.

The hydrate of sodium tripolyphosphate, $Na_5P_3O_{10}\cdot 6H_2O$, is formed by the addition of either Form I or Form II to water. Both anhydrous forms are metastable in water and cannot be recrystallized from water.

The major difference between the structures of Form I and Form II is in the ionic coordination of the sodium ions. In Form II all sodium ions are coordinated octahedrally by oxygen, while in Form I some sodium ions are surrounded by only four oxygen atoms. See Andon et al, *J. Appl. Chem.* (1967), Vol. 17, pages 65–70.

For detergent applications, the commercial sodium tripolyphosphate product is usually a mixture of Form I and Form II in a ratio determined by the needs of the specific detergent manufacture. In addition, commercial products also contain a few percent of sodium pyrophosphate ($Na_4P_2O_7$). The latter is the result of using a slight excess of $Na_2O$ over the theoretical $Na_2O/P_2O_5$ ratio of 5:3 during the manufacturing process for the purpose of avoiding the formation of any insoluble sodium metaphosphate. The presence of even a minor amount of insoluble sodium metaphosphate in the product can cause turbidity in a water solution, a highly undesirable feature for detergent applications.

The major function of sodium tripolyphosphate ($Na_5P_3O_{10}$) as a detergent builder depends upon its water-softening action through complexing or sequestering of calcium and magnesium ions in hard water. Another important function of sodium tripolyphosphate in detergents is its ability to suspend and peptize dirt particles. The tripolyphosphate anion is also important for its ability to lower the critical micelle concentration of the detergent.

The market today for detergent builders is quite diverse. The best known field of application for builders is in heavy duty, spray dried detergent formulations for household use. These widely advertised products generally contain about 25 to about 35% by weight of phosphates in the form of sodium tripolyphosphate or a mixture of sodium tripolyphosphate and tetrasodium pyrophosphate. In the household market, there are also low sudsing detergent formulations containing a sodium tripolyphosphate builder. Additionally, many light duty synthetic detergents, as well as the liquid detergents, contain sodium tripolyphosphate.

Through hydration in the synthetic detergent manufacturing process, except for a few percent of degradation products, all of the original $Na_5P_3O_{10}$ is converted to $Na_5P_3O_{10}\cdot 6H_2O$.

The general method for producing STPP is to react phosphoric acid (herein used to mean either the anhydride $P_2O_5$ or the acid itself) and sodium carbonate (soda ash) together in an aqueous solution until the mole ratio of sodium to phosphorus is about 5:3. The reaction results in formation of an aqueous mixture containing monosodium orthophosphate ($NaH_2PO_4$) and disodium orthophosphate ($Na_2HPO_4$) in a mole ratio of about 1:2. The aqueous mixture is then dried to a powder of crystalline form. STPP is then formed by heating at a controlled temperature, in the range of about 250° to about 600° C. an intimate mixture of the disodium orthophosphate and monosodium orthophosphate in a 2 to 1 ratio in accordance with the following equation:

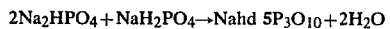

$$2Na_2HPO_4 + NaH_2PO_4 \rightarrow Na_5P_3O_{10} + 2H_2O$$

The problems involved in making commercial sodium tripolyphosphate exhibiting (1) a high assay of $Na_5P_3O_{10}$, (2) the desired ratio of crystalline Form 1 and Form 2, and (3) suitable physical properties, have led to a wide variety of processes. These include spray-drying the orthophosphate precursor prior to calcination; spray-drying the orthophosphate solution directly to the final product, as disclosed in Canadian Pat. No. 543,968; introducing the orthophosphate liquor directly into the calcine, as disclosed in U.S. Pat. No. 2,419,148; carrying out the continuous comminution during calcining as disclosed in U.S. Pat. No. 2,747,964; and even melting, chilling to give partial vitrification, and subsequently tempering as disclosed in U.S. Pat. No. 2,174,614.

Previously, phosphoric acid made by the "thermal method" was the only acid suitable for the reaction with soda ash to form the sodium orthophosphate mixture. Thermal acid is formed by the oxidation of elemental phosphorus to form phosphoric anhydride which is then hydrated to phosphoric acid. The thermal phosphoric acid, after being treated with hydrogen sulfide or sodium hydrosulfide to remove heavy metal impurities, is then diluted to 75, 80 or 85% phosphoric acid for commercial applications. Phosphoric acid made from thermal acid has a minimum of impurities, however, its use entails the requirement of relatively expensive capital equipment, large amounts of electrical energy, and pollution control. Because of the wide gap between the price of wet process phosphoric acid and the price of electro-thermal acid made from elemental phosphorus, increasing attention has been drawn to the use of wet process phosphoric acid as a substitute in those areas of technology where phosphoric acid made from the thermal method was principally utilized.

Among the disadvantages of using wet process phosphoric acid for the production of sodium tripolyphosphate is the fact that wet process phosphoric acid contains numerous impurities which impart undesirable color to sdium tripolyphosphate. For example, wet process phosphoric acid contains impurities such as organic matter, vanadium, and iron which can lead to a brown, yellow, green, gray, pink or other colored sodium tripolyphosphate product, depending upon the quantity and oxidation state of impurities present in the acid.

The present invention has achieved an efficient and commercially feasible method for producing sodium tripolyphosphate from wet process phosphoric acid. Moreover, the process of the present invention is characterized by a simple, efficient approach for producing white sodium tripolyphosphate from the neutralization of wet process phosphoric acid with soda ash or sodium hydroxide.

DESCRIPTION OF THE PREFERRED EMBODIMENT

In accordance with the present invention, a wet process phosphoric acid having a concentration of from about 10% to about 60% $P_2O_5$ is neutralized to a pH at which the ratio of Na:P is about 5:3, with a stoichiometric amount of sodium carbonate or sodium hydroxide. This pH will generally range between from about 6 to about 8. Other neutralizing agents can also be used, such as sodium bicarbonate, sodium sesquicarbonate, and mixtures thereof, including mixtures of the aforesaid with $Na_2CO_3$ and/or NaOH.

The neutralization product comprising a mixture of mono- and disodium orthophosphate is contacted with ozone, hydrogen peroxide or mixtures thereof in an amount sufficient to oxidize the color causing components of the acid to a form wherein they are no longer a problem. Organic material present in the acid is oxidized to carbon dioxide and lower molecular weight organic residues which form precipitates. Ferrous ions are oxidized to the more insoluble ferric form which can then be separated. Vanadium is also oxidized to the +5 state and removed. Separation can be accomplished by filtration, centrifugation or other equivalent means. After separating the residual soluble material, the sodium orthophosphate salts are dried and heated to a temperature from about 250° to about 600° C. to effect the change into sodium tripolyphosphate. The product sodium tripolyphosphate satifactorily compares with analytical reagent grade sodium tripolyphosphate.

The use of hydrogen peroxide or ozone, or mixtures thereof as oxidizing and bleaching agents is advantageous since any excess present decomposes without adversely affecting the sodium:phosphorus ratio. Additionally, since $H_2O_2$ decomposes to give $H_2O+0$, and ozone decomposes to give $O_2+0$, no contaminating residues remain.

The success of ozone and hydrogen peroxide as oxidizing and bleaching agents for sodium tripolyphosphate is unexpected in view of the lack of success with various other oxidizing agents. For example, sodium hypochlorite, potassium permanganate and sodium chlorate were unsuccessful in attempts to produce a white sodium tripolyphosphate.

In accordance with the present invention, a number of tests were conducted wherein various oxidizing and bleaching agent candidates were introduced into batches of mixed sodium orthophosphate salts made from the neutralization of wet process phosphoric acid and soda ash. In the Examples, all parts and percentages are by weight unless otherwise noted.

EXAMPLE 1–14

700 grams of wet process phosphoric acid containing 54% $P_2O_5$, 0.02% total organic carbon (TOC) and 0.65% Fe were diluted with 1820 ml. of water, thereby adjusting the concentration of $P_2O_5$ to 15%. The wet process acid was neutralized by being contacted with dry soda ash until a pH of 6.55 was reached at 22° C. A greenish-grey precipitate of insoluble metal phosphates, oxides and hydroxides started to form at a pH of about 4. The neutralized solution containing the suspended precipitate was divided into 14 equal portions.

10 grams of a 5% solution of sodium hypochlorite (NaOCl) was added to the first portion and stirred for ½ hour. The pH of the solution was adjusted to give an Na:P ratio of 5:3 by dropwise addition of the starting acid. The precipitate of metal phosphates, oxides and hydroxides was filtered and the filtrate evaporated to dryness and placed in a furnace at 350° C. for three hours. The sodium tripolyphosphate thereby formed was removed from the furnace, allowed to cool to room temperature and was ground to pass through a 100 mesh screen.

One gram of the ground sodium tripolyphosphate was dissolved in 99 ml. of water to give a 1% STPP solution. The pH was 9.35. Another portion of the 100 mesh sodium tripolyphosphate was compared to reagent grade sodium tripolyphosphate of a similar mesh. The color was compared and recorded in Table I. The remaining part of the sample was analyzed for iron content by the atomic absorption method as described, e.g., in "Analytical Methods for Flame Spectroscopy" published by Varian Techtron Co. This data was also recorded in Table I.

The above procedure was repeated using the following chemicals and amounts:
Sample 2—50 grams of 5% NaOCl solution added.
Sample 3—0.5 grams of Norit A activated carbon added.
Sample 4—2.5 grams of Norit A activated carbon added.
Sample 5—1.54 grams of sodium sulfide ($Na_2S.9H_2O$) added.
Sample 6—7.69 grams of $Na_2S.9H_2O$ added.
Sample 7—0.5 grams of sodium chlorate ($NaClO_3$) added.
Sample 8—2.5 grams of $NaClO_3$ added.
Sample 9—0.5 grams of potassium permanganate ($KMnO_4$) added.
Sample 10—1.67 grams of 30% hydrogen peroxide ($H_2O_2$) solution added.
Sample 11'8.35 grams of 30% $H_2O_2$ added.

The remaining three samples were filtered and treated in the following manner: 10 grams of 5% NaOCl solution were added to Sample 12, 0.5 grams of Norit A activated carbon were added to Sample 13, and 1.67 grams of 30% hydrogen peroxide were added to Sample 14. All three samples were stirred for ½ hour, filtered, evaporated to dryness and placed in a furnace at 350° C. for 3 hours. The sodium tripolyphosphate thereby formed was then removed from the furnace, ground to pass a 100 mesh screen and dissolved in water to give a 1% STPP solution. The remaining STPP portions of Samples 12 to 14 were color compared to reagent grade sodium tripolyphosphate, and analyzed for iron content by the atomic absorption method. The results are tabulated below in Table 1.

Sample 26—2.5 grams of $K_2Cr_2O_7$ added.
Sample 27—1.67 grams of 30% $H_2O_2$ solution added.
Sample 28—8.35 grams of 30% $H_2O_2$ solution added.

Each of the above samples was stirred for one half hour, filtered, and the pH adjusted to give a Na:P ratio of 5:3. The solutions were evaporated to dryness and then placed in an oven at 350° C. for three hours, thereby producing sodium tripolyphosphate. Each sodium tripolyphosphate sample was weighed, and ground to pass a 100 mesh sieve. One gram of each sodium tripolyphosphate sample was dissolved in 99 ml. of water and the pH recorded. The color of each sample was compared to reagent grade sodium tripolyphosphate of the same mesh size. The remaining portion of each sodium tripolyphosphate sample was analyzed for its iron content. The data resulting from the above experiments has been tabulated in Table 2 below:

TABLE 1
EXAMPLES 1-14

| SAMPLE NO. | ADDITIVE | AMOUNT | RATIO OF OXIDIZING AGENT TO TOC | STPP YIELD (%) | STPP COLOR | 1% SOLUTION COLOR | pH** | Fe* ppm |
|---|---|---|---|---|---|---|---|---|
| 1 | NaOCl | 1% | 50 | 84.2 | slight grey | cloudy | 9.35 | 115 |
| 2 | NaOCl | 5% | 250 | 94.1 | " | " | 9.12 | 86 |
| 3 | activated carbon | 1% | 50 | 87.7 | " | " | 9.25 | 450 |
| 4 | activated carbon | 5% | 250 | 81.3 | " | " | 9.10 | 160 |
| 5 | $Na_2S$ | 1% | 50 | 87.0 | grey | " | 9.40 | 1000 |
| 6 | $Na_2S$ | 5% | 250 | 82.7 | slight grey | " | 9.20 | 235 |
| 7 | $NaClO_3$ | 1% | 50 | 87.5 | " | " | 9.10 | 280 |
| 8 | $NaClO_3$ | 5% | 250 | 86.5 | grey | " | 9.10 | 110 |
| 9 | $KMnO_4$ | 1% | 50 | 82.0 | purple | purple | 9.00 | 165 |
| 10 | $H_2O_2$ | 1% | 50 | 92.0 | white | clear | 9.45 | 70 |
| 11 | $H_2O_2$ | 5% | 250 | 93.3 | white | clear | 9.45 | 65 |
| 12 | NaOCl | 1% | 50 | 83.7 | slight grey | cloudy | 9.50 | 45 |
| 13 | act. carbon | 1% | 50 | 86.6 | white | clear | 9.35 | 43 |
| 14 | $H_2O_2$ | 1% | 50 | 91.4 | white | clear | 9.45 | 43 |

*Fe content of reagent grade STPP = 28
**pH of 1% solution of reagent grade STPP = 9.52

EXAMPLES 15-28

700 grams of wet process phosphoric acid containing 34% $P_2O_5$, 0.04% total organic carbon and 0.24% iron were diluted with 887 ml. of water to give an acid concentration of 15% $P_2O_5$. The acid was neutralized with soda ash until a pH of 6.55 was reached at 22° C. A greenish grey precipitate started to form at a pH of about 4.0. The neutralized solution was divided into 14 equal parts and treated in the following manner:

Sample 15—10 grams of 5% NaOCl solution added.
Sample 16—50 grams of 5% NaOCl solution added.
Sample 17—0.5 grams of Norit A activated carbon added.
Sample 18—2.5 grams of Norit A activated carbon added.
Sample 19—1.54 grams of $Na_2S.9H_2O$ added.
Sample 20—7.69 grams of $Na_2S.9H_2O$ added.
Sample 21—0.5 grams of $NaClO_3$ added.
Sample 22—2.5 grams of $NaClO_3$ added.
Sample 23—0.5 grams of $KMnO_4$ added.
Sample 24—2.5 grams of $KMnO_4$ added.
Sample 25—0.5 grams of potassium dichromate added ($K_2Cr_2O_7$).

TABLE 2
EXAMPLES 15-28

| SAMPLE NO. | ADDITIVE | AMOUNT | RATIO OF OXIDIZING AGENT TO TOC | STPP YIELD % | STPP COLOR | 1% SOLUTION COLOR | pH* | Fe** ppm |
|---|---|---|---|---|---|---|---|---|
| 15 | NaOCl | 1% | 25 | 77.3 | grey | light brown | 9.24 | 17 |
| 16 | NaOCl | 5% | 125 | 86.8 | grey | " | 9.30 | 18 |
| 17 | act. carbon | 1% | 25 | 66.5 | slight grey | clear | 9.12 | 16 |
| 18 | act. carbon | 5% | 125 | 67.8 | slight grey | " | 9.00 | 21 |
| 19 | $Na_2S$ | 1% | 25 | 67.3 | grey | yellow/green | 9.54 | 14 |
| 20 | $Na_2S$ | 5% | 125 | 74.9 | " | " | 9.12 | 15 |
| 21 | $NaClO_3$ | 1% | 25 | 64.1 | pink | " | — | — |
| 22 | $NaClO_3$ | 5% | 125 | 68.3 | pink | — | — | — |
| 23 | $KMnO_4$ | 1% | 25 | 72.4 | purple | — | — | — |
| 24 | $KMnO_4$ | 5% | 125 | 73.7 | purple | — | — | — |
| 25 | $K_2Cr_2O_7$ | 1% | 25 | 81.2 | lt. green | — | — | — |
| 26 | $K_2Cr_2O_7$ | 5% | 125 | 86.4 | green | — | — | — |
| 27 | $H_2O_2$ | 1% | 25 | 88.4 | white | clear | 9.37 | 13 |
| 28 | $H_2O_2$ | 5% | 125 | 82.6 | white | clear | 9.53 | 11 |

*pH of 1% solution of reagent grade STPP = 9.52
**Fe content of reagent grade STPP = 28 ppm

EXAMPLE 29

75.3 grams of wet process phosphoric acid containing 54% $P_2O_5$, 0.02% total organic carbon and 0.65% iron were diluted with approximately 196 milliliters of water to give an acid concentration of 15% $P_2O_5$. 50.6 grams of sodium carbonate were added to the solution, giving a pH of 6.59 at 23° C. A grayish-green precipitate of metal hydroxides, oxides, carbonates and phosphates began appearing at a pH of 4.5. The mixture was filtered. An ozone-air stream was then bubbled through the filtrate at a rate of 260 milliliter per minute. A 26 volt ozone generator furnished the ozone at a concentration of 360 parts per million, of the air stream. The ozone-air stream was bubbled through the filtrate for 40 minutes. The total weight of ozone introduced into the filtrate was calculated to be 0.0112 grams, or a weight percent of 0.02% ozone based upon the initial weight of wet process phosphoric acid.

The orthophosphate solution was evaporated to dryness and then placed in a furnace at 350° C. for three hours, thereby producing sodium tripolyphosphate. The sodium tripolyphosphate was slightly off white in color, and had an iron content of 110 ppm. The slightly off white color can be attributed to the low concentration of ozone used. It is expected that higher concentrations of ozone would produce white sodium tripolyphosphate similar in properties to that produced by the hydrogen peroxide.

What is claimed is:

1. A process for the preparation of sodium tripolyphosphate from wet process phosphoric acid containing color causing impurities which comprises sequentially performing the steps of:
   (a) neutralizing said wet process phosphoric acid within the pH range from about 6 to about 8 with an alkali selected from the group consisting of soda ash, sodium hydroxide, sodium bicarbonate, sodium sesquicarbonate, and mixtures thereof to form a solution of mixtures of mono- and disodium orthophosphates containing organic or inorganic precipitate;
   (b) contacting said solution containing organic or inorganic precipitate with an oxidizing agent selected from the group consisting of ozone, hydrogen peroxide, and mixtures thereof in an amount sufficient to oxidize and precipitate color causing impurities;
   (c) separating the precipitated color causing impurities of step (b) from said solution of mixtures of orthophosphates; and
   (d) drying and heating said solution of mixtures of orthophosphates to effect the change to sodium tripolyphosphate.

2. The process of claim 1 wherein the separation of step (c) is by filtration.

3. The process of claim 1 wherein the amount of oxidizing agent varies from about 0.1 to about 10% by weight of the total weight of wet process phosphoric acid.

4. The process of claim 1 wherein the neutralization of wet phosphoric acid is accomplished with an alkali selected from the group consisting of soda ash, sodium hydroxide, and mixtures thereof.

5. The process of claim 1 wherein the oxidizing agent is hydrogen peroxide.

6. The process of claim 1 wherein wet process phosphoric acid is neutralized with alkali to a pH at which the Na:P ratio is about 5:3.

* * * * *